Patented Apr. 12, 1932

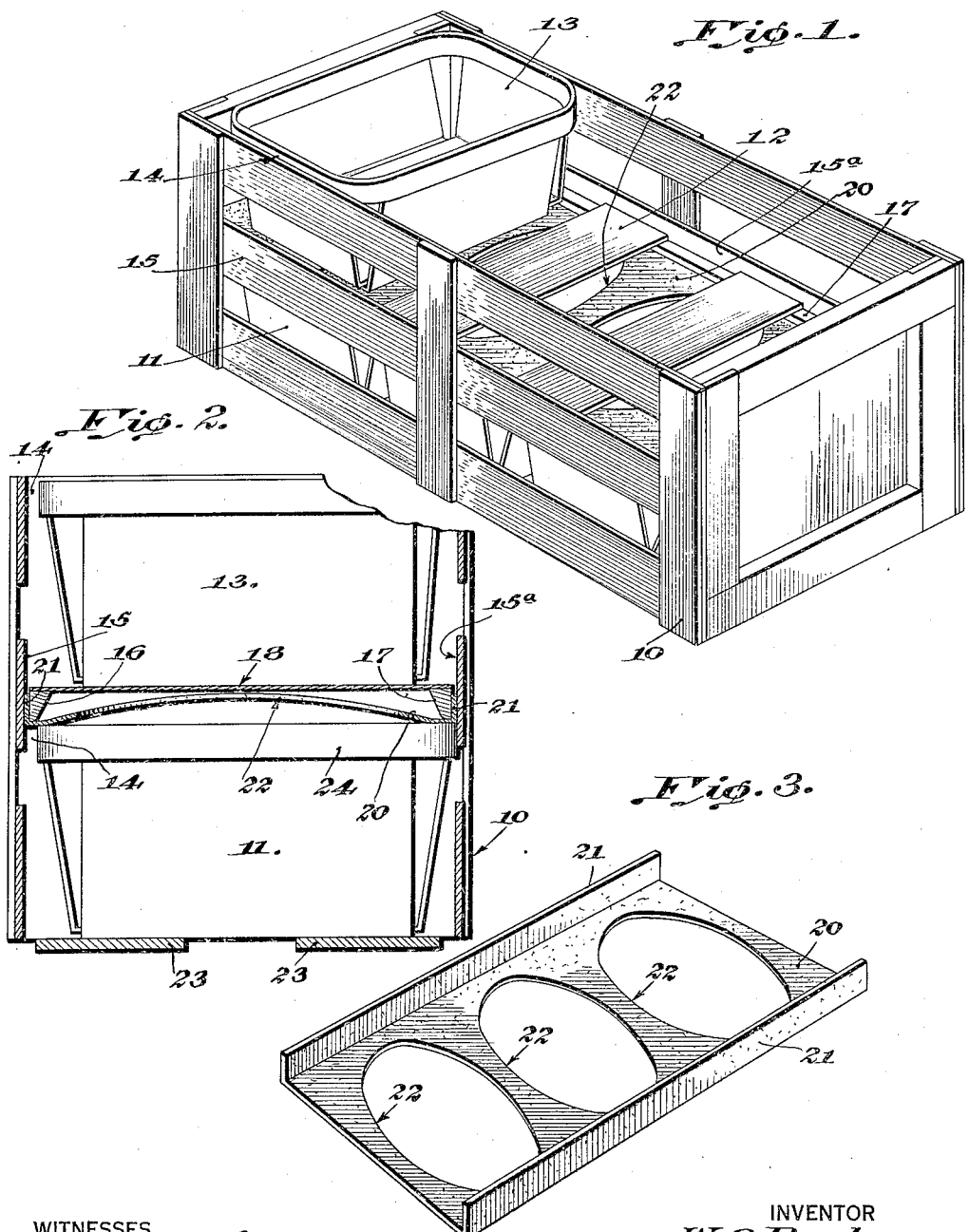

1,854,097

UNITED STATES PATENT OFFICE

WILLIAM C. BEWLEY, OF MACON, GEORGIA

PROTECTIVE DEVICE FOR FRUITS AND VEGETABLES IN PACKING CRATES

Application filed April 17, 1931. Serial No. 530,977.

This invention relates to a device for aiding in protecting fruits or vegetables packed in crates.

When fruits or vegetables are packed in cups the upper layers of the fruits or vegetables project above the upper edge of the cups so that when the usual partition formed of transverse slats and longitudinal side bars is placed on the cups for supporting an upper layer of packed cups and a longitudinal bar of the partition or tray slips beyond the ends of the cups, not only the slats or transverse bars of the partition or tray but the other side bar will come into contact with the fruit or vegetables and cause abrasion and injury to the friuts or vegetables. Furthermore the packed fruits or vegetables more than fill the cups so that the longitudinal bars rest frequently on the fruits and vegetables. A number of devices have been proposed in connection with the tray or partition for aiding in supporting the partition at a predetermined height above the cups and also above the upper layer of the fruits or vegetables. Such devices, however, are not practical due to the complicated structure and also due to the fact that shrinkage of the wood forming the trays and the crates is not taken into consideration.

An object of the invention is the provision of a device formed of flexible material which is adapted to rest upon cups in a lower layer in a packing crate and which will retain the usual partition which supports the upper layer of packed cups, the device being provided with flanges engaging the side walls of the crate and the longitudinal side edges of the partition and such flanges co-operate in retaining the partition in operative position on the cups and away from the fruits or vegetables packed in the cups.

A further object of the invention is the provision of a retaining device for aiding in supporting the usual tray or partition placed upon a lower layer of cups, above the cups, and likewise above the fruits or vegetables contained in the cups, said device being formed of a sheet of flexible material such as relatively stiff paper, leather, thin sheet metal, or a sheet formed of any kind of composition material.

A still further object of the invention is the provision of a device for aiding in retaining a partition or tray located between a layer of cups in a packing crate above the fruit or vegetables in the lower layer of cups, said device having side flanges and being formed of some suitable flexible material and of a greater width than the interior of the packing crate so that when the device is placed within the crate and is bowed upwardly by the natural bulge of the fruits or vegetables in the lower layer of the cups. The width of said member will be great enough to allow the flanges to rest between the side bars of the tray and the side walls of the crate, said member being provided with a plurality of passages to permit the circulation of air with flanges along the longitudinal edges thereof co-operating with the flexible member for preventing slippage of a longitudinal side edge of the trays or partition downwardly between the side walls of the crate and the adjacent ends of the cups.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawings:

Figure 1 is a view in perspective of a packing crate showing my invention applied thereto, Figure 2 is a transverse vertical section of a packing crate showing my invention in position, and Figure 3 is a view in perspective of a flexible member for aiding in supporting a partition on a layer of cups.

Referring more particularly to the drawings, 10 generally designates a standard six-carrier crate in which is disposed a layer of cups 11 which are adapted to be packed with fruits or vegetables. In the usual practice, the partition or supporting tray 12 is located upon the tops of the cups 11 in the lower layer and the partition supports a plurality of cups 13 above the tops of the lower layer. It will be noted, however, that the length of the cups 11 and 13 is shorter than the width of the crate. The cups are made of green wood and when first applied to the trays if they have been received at an early stage from the factory will neatly fit within the crates but such cups dry out and shrink very readily due to the drying out of the wood so that the cups do not neatly fit the tray and a space as shown at 14 is generally present between one end of the cups and a side wall or bar 15 of the crate.

The partition or tray 12 consists of a pair of wedge-shaped longitudinally disposed bars 16 and 17 which are connected together by means of slats 18 extending transversely of the partition and also transversely of the crate 10. Due to the wedge-shape of the longitudinally disposed bars 16 and 17, one of the bars will gradually find its way downwardly into the space 14 and between ends of the cups 11 and the bar 15 of the side wall so that the slats 18 will move downwardly upon the fruit or vegetable and the other side bar will also be forced downwardly and cause an abrasion and injury to the fruits.

In order to overcome the disadvantage of the construction now in use I have applied a sheet of flexible material 20 to the top of the cups 11 and since this sheet is wider than the interior width of the crate 10, said sheet will be bowed outwardly, as shown in Fig. 2, and follow the natural bulge of the top layer of the fruits or vegetables packed in the cups 11.

Flanges 21 are formed integrally with the member 20 and extend upwardly and are normally located between the longitudinal side bars 16 and 17 of the partition 12 with the lower longitudinal edges of said side bars resting upon the longitudinal side edges of the member 20.

Elongated openings 22 are disposed transversely of the member 20 so that they will register with the tops of the cups 11 and provide for a circulation of air through the crate. While I have shown the openings 22 as oval it will be appreciated, however, that such openings may be rectangular in shape or any shape suitable for the purpose. It will be appreciated that instead of the three spaced longitudinal openings 22 that the member 20 may be perforated sufficiently throughout its surface to permit circulation of air.

In packing the crate 10 three cups 11 are located in the lower layer and these cups rest upon the bottom bars 23 of the crate. The reinforcing strips 24 of the cups 11 are in a horizontal plane which cuts the lower portion of the side bars 15 and 15ª of the side walls of the crate. The retaining sheet or member 20 is placed upon the tops of the cups 11 with the side flanges 21 in engagement with the side bars 15 and 15ª and since the sheet 20 is wider than the interior width of the crate the sheet will be bowed outwardly and follow the natural bulge of the top layer of fruits or vegetables located in the cups 11.

The tray or partition 12 is in then seated upon the member 20 in such a manner that the longitudinal side bars 16 and 17 will have their lower ends resting upon the member 20 adjacent the longitudinal edges with the flanges 21 located between the side bars 16 and 17 of the partition 12 and the side bars 15 and 15ª and the side walls of the crate 10. It will be seen by this construction that the member 20 while being flexible and capable of being bowed outwardly will be sufficiently stiff to support not only the side bars 16 and 17 of the partition but also acts as a cushion between said bars and the fruit and vegetables in the cups 11. The thickness of the member 20 will be sufficient to prevent the wedge-shaped longitudinal bar 16 from slipping downwardly into the space 14.

The flexible sheet 20 may be made of cardboard, thin sheet metal, leather, or any material suitable for the purpose. A relatively stiff paper cardboard, however, will be economical and suitable for the purpose.

I claim:

1. A packing crate for a plurality of layers of cups carrying fruits and vegetables, a removable partition for supporting a superposed layer of cups on a lower layer, and a flexible member having flanges at the longitudinal edges thereof for engagement with the side walls of the crate, said member being adapted to support the partition above the lower layer of cups and preventing a longitudinal edge of the partition from slipping below the adjacent ends of the cups.

2. In a standard packing crate for fruits and vegetables in which a plurality of layers of cups are carried in the crate, a partition for aiding in supporting an upper layer of cups from a lower layer and a flexible member resting on the tops of the cups in the lower layer, supporting the partition and preventing the edges of the partition from slipping below the adjacent ends of the cups.

3. In a standard packing crate for fruits and vegetables in which a plurality of layers of cups are carried in the crate, a partition for aiding in supporting an upper layer of cups from a lower layer and a flexible member resting on the tops of the cups in the lower layer, supporting the partition and preventing the edges of the partition from slipping below the adjacent ends of the cups, said flexible member being provided with spaced elongated openings disposed transversely of said member and adapted to be located over the cups.

4. A retaining device for a cup supporting partition in a fruit and vegetable packing crate comprising a sheet of flexible material, flanges projecting upwardly from the longitudinal edges of said flexible member, said member being provided with spaced transverse openings.

5. A retaining device for a cup supporting partition in a fruit and vegetable packing crate comprising a sheet of flexible material, flanges projecting upwardly from the longitudinal edges of said flexible member, said member being provided with spaced transverse openings, the width of the member being greater than the interior width of the crate so that when the member is fitted into the crate said member will be bowed outwardly.

6. A retaining device for a cup supporting partition in a fruit and vegetable packing crate comprising a sheet of relatively stiff but flexible material, flanges projecting upwardly from the longitudinal edges of said member, the width of said member being greater than the interior width of the crate so that when the member is forced into the crate upon the tops of cups in the crate said member will be bowed outwardly.

7. A retaining device for a cup supporting partition in a fruit and vegetable packing crate comprising a sheet of flexible material, flanges projecting upwardly from the side edges of said member, the member acting as a cushioning means between the partition and the fruit and vegetables.

WILLIAM C. BEWLEY.